United States Patent
Sporn

(10) Patent No.: US 6,662,753 B1
(45) Date of Patent: Dec. 16, 2003

(54) MULTI-FUNCTIONAL ANIMAL LEASH

(76) Inventor: Joseph Sporn, 274 W. 86th St., New York, NY (US) 10024

( * ) Notice: Subject to any disclaimer, the term of this patent is extended or adjusted under 35 U.S.C. 154(b) by 47 days.

(21) Appl. No.: 10/238,224

(22) Filed: Sep. 11, 2002

(51) Int. Cl.[7] ............................................. A01K 29/00
(52) U.S. Cl. .................................................... 119/797
(58) Field of Search ........................ 119/769–771, 792, 119/795, 797, 856, 863

(56) References Cited

U.S. PATENT DOCUMENTS

| | | | | | |
|---|---|---|---|---|---|
| 2,212,746 A | * | 8/1940 | Nunn | ........................... | 119/770 |
| 2,861,547 A | * | 11/1958 | Dale | ........................... | 119/797 |
| 3,752,127 A | * | 8/1973 | Baker | ........................... | 119/797 |
| 4,667,624 A | * | 5/1987 | Smith | ........................... | 119/770 |
| 5,306,044 A | * | 4/1994 | Tucker | ..................... | 280/801.1 |
| 5,511,293 A | * | 4/1996 | Hubbard, Jr. et al. | ......... | 24/442 |
| 5,518,486 A | * | 5/1996 | Sheeler | ........................ | 482/131 |
| 5,666,909 A | * | 9/1997 | Dupre | ........................ | 119/797 |
| 5,947,062 A | * | 9/1999 | Hoffman et al. | ............ | 119/769 |

* cited by examiner

Primary Examiner—Thomas Price

(57) ABSTRACT

A leash for leading or restraining an animal, comprising an elongated flexible strap having first and second ends, a first hook and ring attached respectively to the first end of the strap and to a distal point on the strap for selectively creating a holding loop at the first end of the strap, a second hook attached to the second end of the strap, a slidable tri-glide having an attached ring for receiving the second hook, and carried by the strap intermediate the second end and the first ring, for creating a collar loop, and an adjustable stop slidably carried by the strap intermediate the second end of the strap and the slidable tri-glide for limiting constriction of the collar loop.

9 Claims, 6 Drawing Sheets

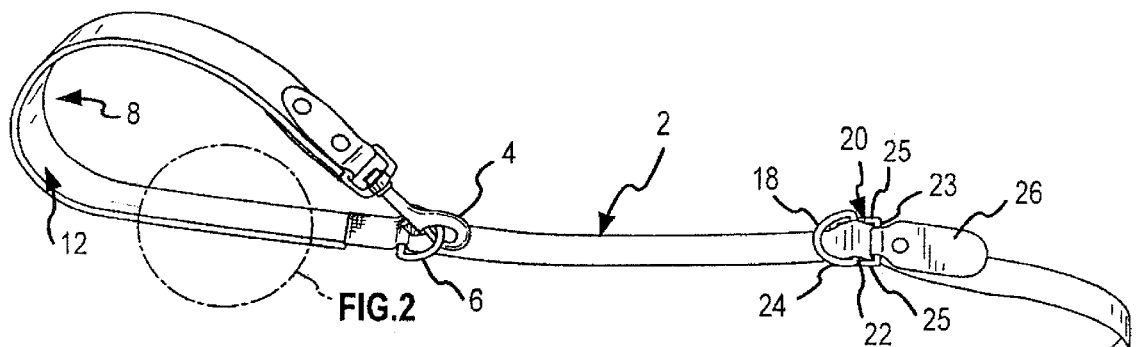
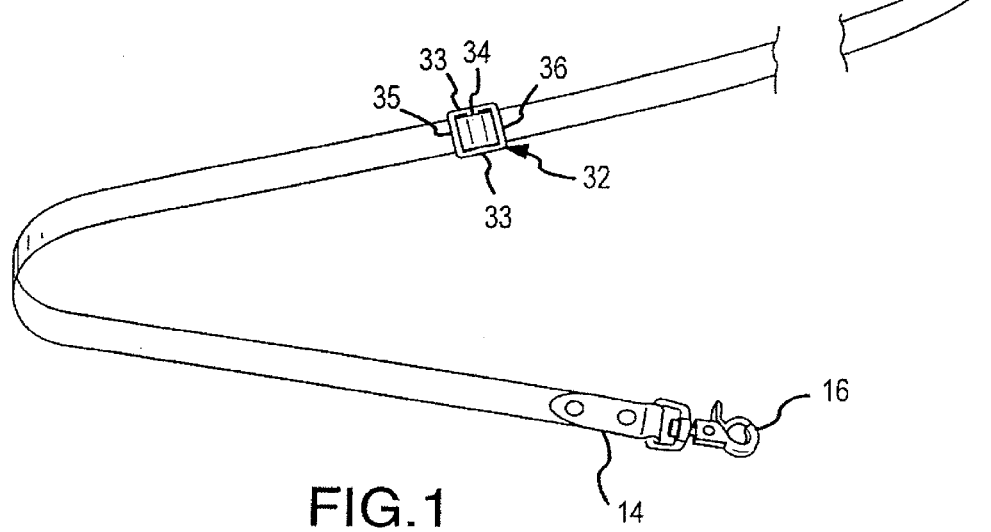
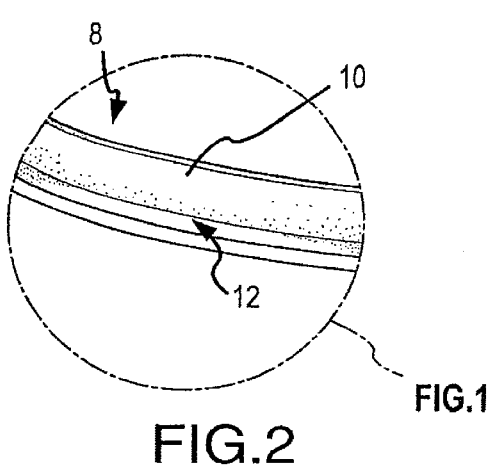
FIG.1
FIG.2

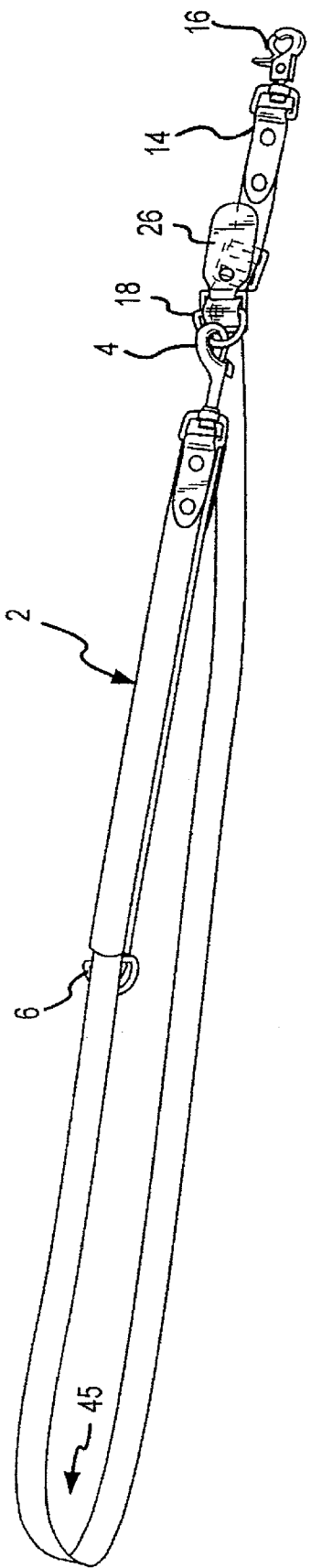
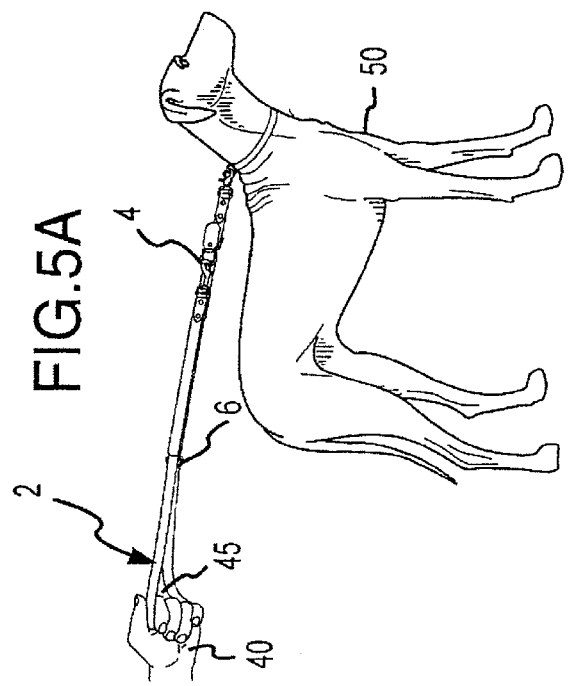
FIG.5A
FIG.5B

MULTI-FUNCTIONAL ANIMAL LEASH

FIELD OF THE INVENTION

The present invention relates to leashes for leading or restraining animals and more particularly to such a leash that is adapted for multiple uses.

BACKGROUND OF THE INVENTION

Animal leashes have been existence for a long period of time, but have primarily been of one basic form with a single purpose. Prior art leashes traditionally comprise a line or lead having on one end a handle loop and on the opposing distal end a fastener for attachment to a neck collar of the animal.

Contrary to the solitary purpose of prior art leashes, the object of the present invention is to provide an animal leash that has multiple uses. The first function of the leash is that of the traditional lead. The leash line is equipped with a closed loop handle on one end and a fastener on the other end for attachment to the neck collar of the animal. In its second configuration, the leash can be quickly converted from a normal length of say five feet to a shortened half-length of approximately two and one half feet. In a third configuration, the loop handle at the proximal end of the leash can be converted from a hand grip size to a larger opening that will enable the loop to be positioned around a tree or post for securing the animal to a fixed object. That same proximal loop can be sized to be worn around the waist of the person leading the animal. Normally, the distal end of the leash will normally be fastened to the animal's neck collar, however, as a fourth configuration of the leash, the present invention allows for the distal end of the leash to quickly be converted to a suitably sized neck collar that will not contract to a smaller size when there is tension on the leash.

SUMMARY OF THE INVENTION

The animal leash of the present invention comprises an elongated flexible strap, or lead, having first (proximal) and second (distal) ends. A proximal first hook and first ring are attached respectively to the proximal end of the strap and to a distal point on the strap for creating, when interconnected, a hand grip loop or larger restraining loop at the proximal first end of the strap. A distal second hook is attached to the distal second end of the strap for attachment to an animal's neck collar and for other purposes to be described. A slidable tri-glide having an attached second ring, for receiving and interconnecting with the second hook, is carried by the strap at a location between the distal end of the leash and the location of the first ring, for the purpose of creating a collar-forming loop. An adjustable stop, preferably in the form of a tri-glide or ladder lock, is slidably carried by the strap intermediate the distal second end of the strap and the slidable tri-glide that carries the second ring. This adjustable stop sets the limit for constriction of the collar loop when tension is applied to the leash. By connecting the first end hook to the first ring or variously positioning the slidable second ring on the leash strap and connecting to that ring either the proximal first end hook or the distal second end hook, all of the aforesaid different functions and uses of the leash may be implemented.

DESCRIPTION OF THE DRAWINGS

FIG. 1 is a prospective view of the multiple purpose leash of the present invention.

FIG. 2 is an enlarged view of that portion of the leash within the dashed circle of FIG. 1.

FIGS. 5A and 5B are prospective views of the leash of the present invention connected in the configuration of a half-length leash.

DETAILED DESCRIPTION OF THE INVENTION

Figure 3:
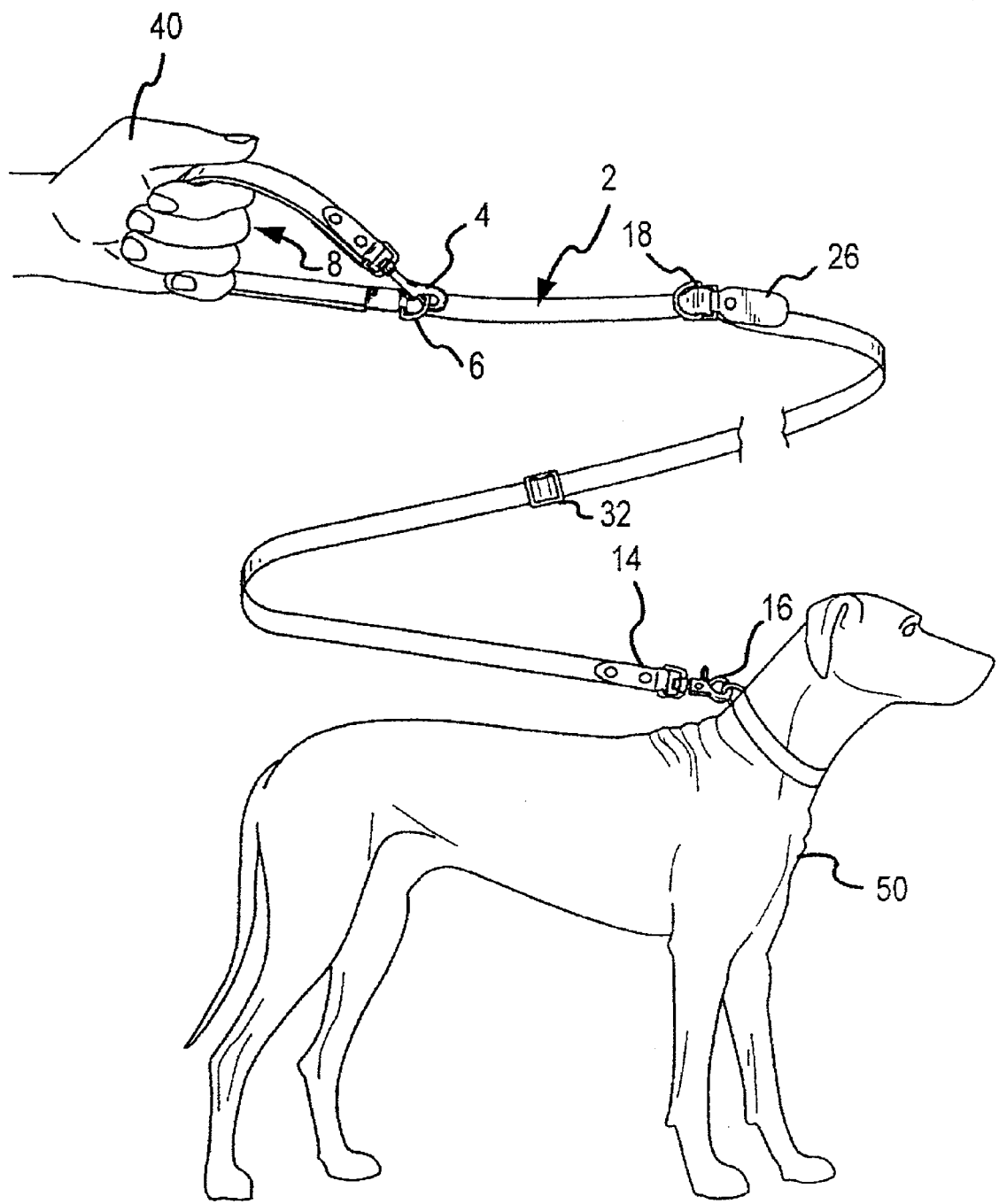
FIG. 3 is a prospective view of the leash of the present invention in use as a traditional leash having a gripping loop handle on the proximal end of the leash line and an attachment device at the distal end for interconnection with the neck collar of an animal.

The leash of the present invention is shown in FIG. 1 as including a strap, or lead line 2, made of flexible material of sufficient strength to accomplish the obvious purpose of restraining an animal. The proximal first end of the strap is provided with hook 4. Preferably the hook is of the type that can be selectively opened and closed for connection to an eye or ring 6 that is secured in a fixed position further down on the leash line away from the proximal end and toward the distal end of the line 2. A spring urged bolt hook is satisfactory for this purpose. When the bolt hook 4 is interconnected with the fixed ring 6, a loop is formed at the proximal end of the leash that can be used as a handle or hand hold 8 by the person leading the animal. As seen in FIG. 2, the restraining handle 8 can be made more comfortable and effective by providing padding 10 on the interior side 12 of the proximal end of the leash strap 2 where the hand 40 of the person leading the animal will grasp the leash handle loop 8.

Figure 4A:
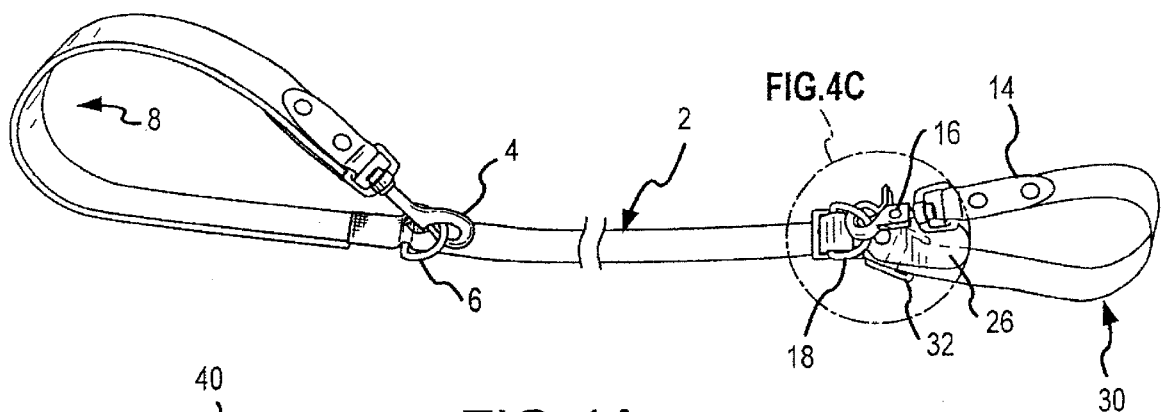
FIG. 4A is a prospective view of the leash connected in a configuration having a loop handle on the one end and a loop in the distal end that forms a neck collar.
Figure 4B:
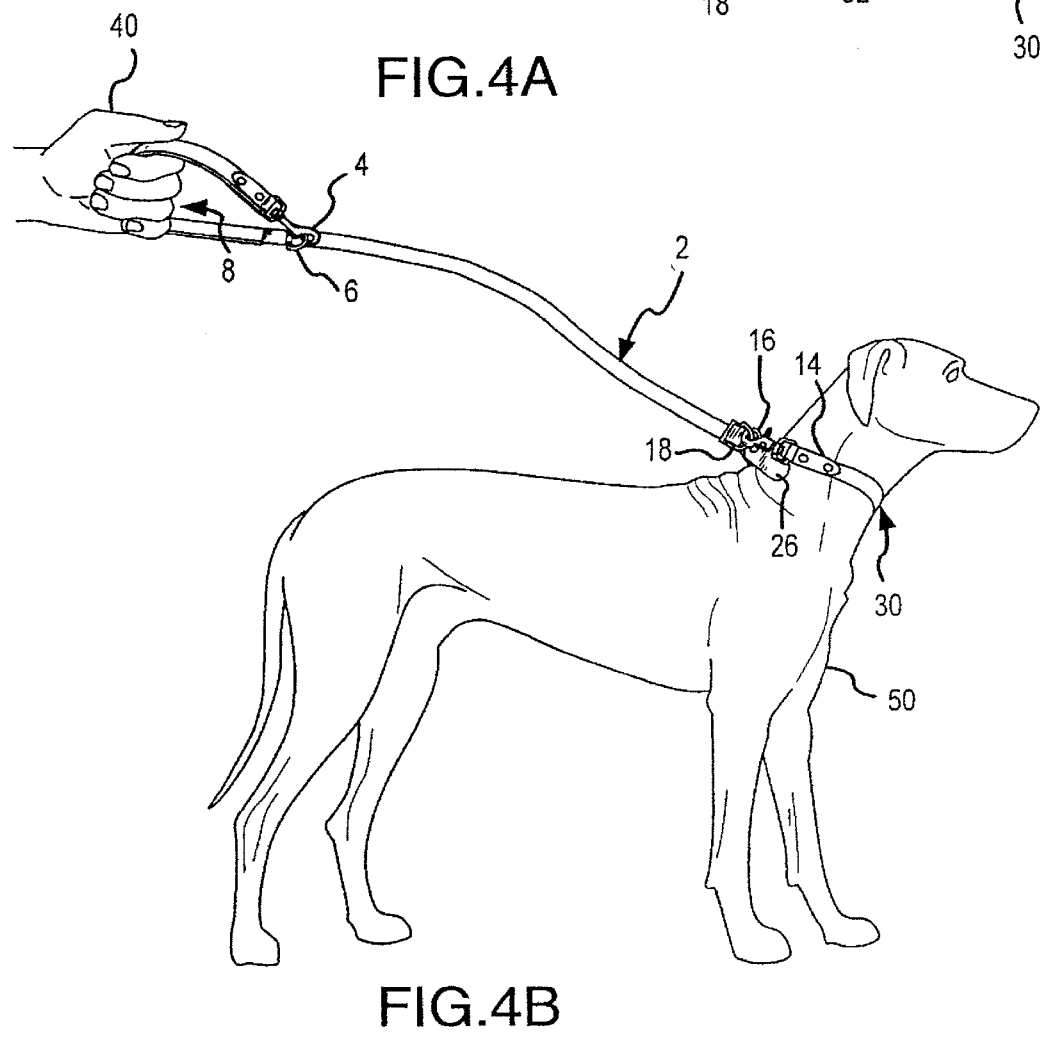
FIG. 4B is a prospective view of the leash configuration of FIG. 4A where the neck collar formed on the distal end of the leash is shown being worn by a dog.
Figure 4C:
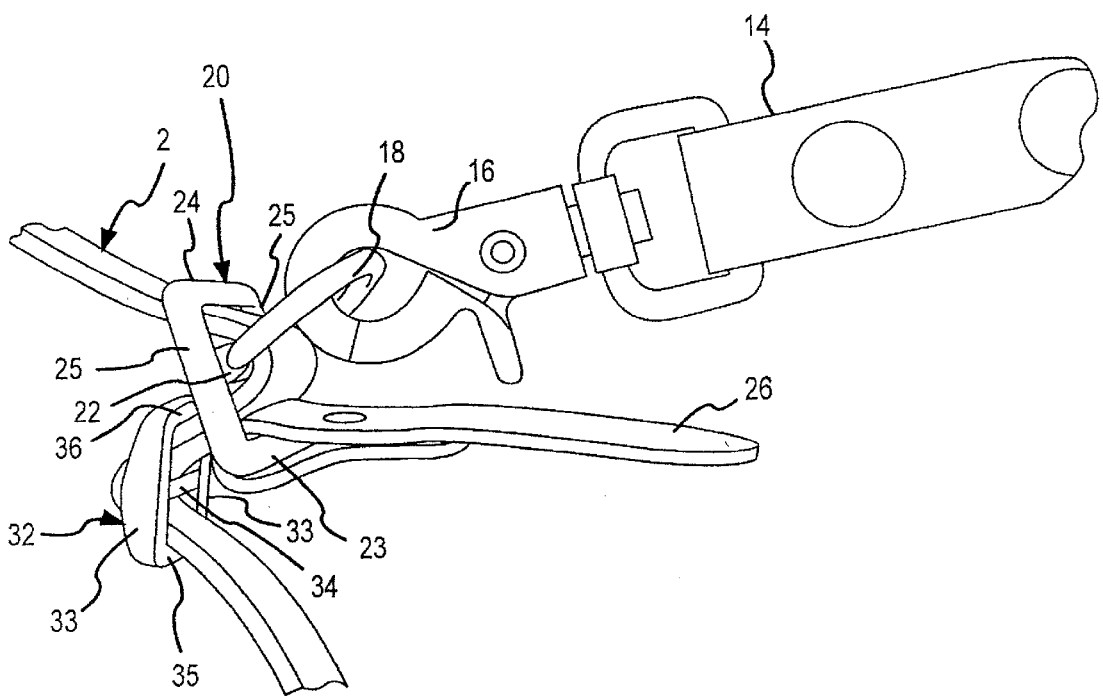
FIG. 4C is an enlarged prospective view of that portion of the leash within the dashed circle of FIG. 4A.
Figure 6A:
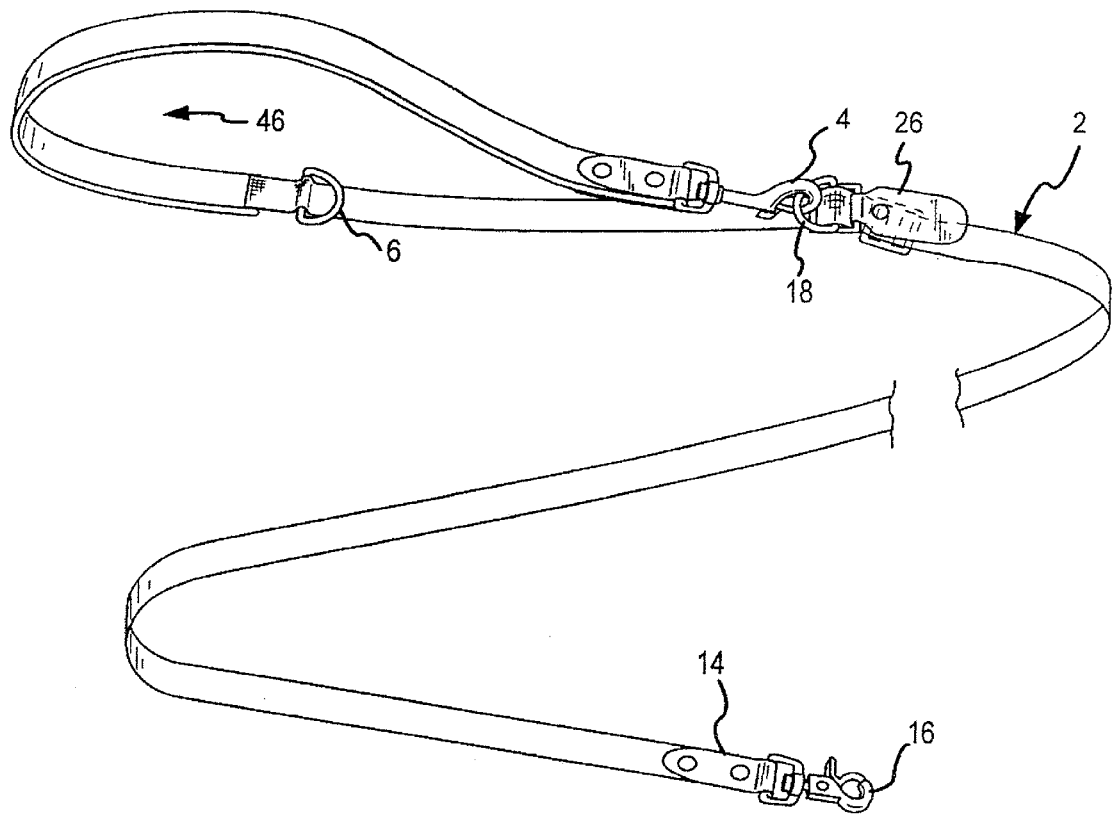
FIG. 6A is a prospective view of the leash connected in the configuration of forming an enlarged restraining loop at the proximal end of the leash line in order to encircle the proximal end of the leash around the trunk of a tree, or a similar fixed object, as shown in FIG. 6B.
Figure 6B:
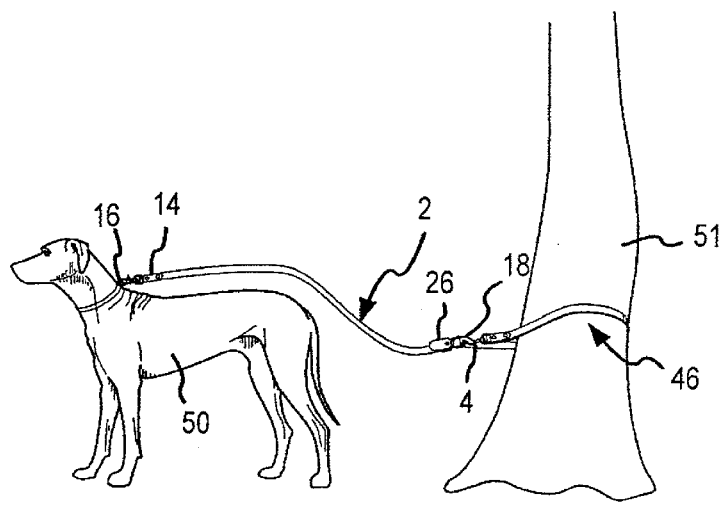

The distal second end 14 of the leash strap is provided with a hook 16 that may be of several types, but is preferably a spring urged snap hook. This snap hook 16 normally attaches directly to the neck collar of an animal, as shown in FIG. 3. However, as shown in FIGS. 4A, 4B and 4C, the distal second end snap hook 16 may be selectively connected to a D-ring 18 that is mounted on, or carried by, a tri-glide 20. The tri-glide comprises a buckle type of device having an inner rung 22 and two spaced apart outer rungs 23 and 24. Side rails 25 interconnect the three mutually parallel rungs. The leash line, or strap, 2 is trained through the rungs of the tri-glide so that the strap 2 lies on top of the inner rung 22 and under or beneath each of the outer rungs 23 and 24. Preferably, the tri-glide 20 is made of metal or plastic having a smooth surface that has a low coefficient of friction with the material of the strap 2. This low frictional force between the strap 2 and the rungs of the tri-glide 20 permits the tri-glide to be easily moved or slid up and down the strap 2.

As seen in FIGS. 4A and 4B, when the distal hook 16 is attached to the D-ring 18 that is carried by the tri-glide 20, a distal loop is formed that can be used as a neck collar 30 for the animal. Because the tri-glide 20 is easily slidable on the strap 2, tension on the leash strap would normally cause the collar loop 30 to contract, or get smaller, resulting in choking of the animal. In order to prevent such an undesirable result, a stop device 32 is positioned on the strap 2 between the distal second end and the tri-glide 20. The stop device 32 can also be selectively positioned on the strap in order that different collar sizes may be selected. After the stop 32 is positioned on the strap 2 for the selected size of neck collar, the tri-glide 20 is slid into position next to the stop 32. When the distal hook is connected to the D-ring 18 on the tri-glide, a loop collar is created that will maintain its set size under tension on the leash because the easily slidable tri-glide cannot move past the stop 32. The stop 32 can be any one of a number of devices or forms. Preferably, the stop is a tri-glide device, similar to the tri-glide 20, but of different dimensions and formed of material having a high coefficient of friction with the strap 2. The tri-glide, when used in this locking, or stop, configuration is sometimes referred to as a "ladder lock." As engaged with the tri-glide 20, the strap 2 is trained over the inner rung 34 of the ladder lock and underneath both of the outer rungs 35 and 36. Because of the relative dimensions of the ladder lock and the strap and the high coefficient of friction provided between the strap and the ladder lock's rungs, purposeful and very intentional manual manipulation of the ladder lock 32 and the strap 2 is required in order to change the position of the stop on the strap 2.

Attached to the distally facing outer rung 24 of the tri-glide 24 is a short leather or fabric tag 26. The tag is disposed to lay flat against the interior side of the leash strap 2. When the distal hook 16 is connected to the D-ring 18 to form an animal neck collar, as described above in connection with FIGS. 4A, 4B and 4C, the tag 26 is positioned to lie underneath the distal hook 16 to protect the neck of the animal from being rubbed and irritated by the hook 16 and to keep the hook 16 from becoming entangled in the neck hair of the animal.

FIGS. 5A and 5B illustrate the half-length version of the leash. In order to utilize this function of the multi-leash, the tri-glide 20 is positioned near the distal end of the leash line 2. The proximal first hook 24 is interconnected with the ring 18 that is carried by the tri-glide 24. In this configuration, a large loop 45 is formed to be used either as a hand hold or as a restraining tie. I this configuration the padding 10 does not assist the hand holding comfort or effectiveness, but the leash is shortened to almost one half of its normal length. The shortened leash length provides tighter control of the animal in training exercises, for example.

There may be instances where, instead of leading the animal from place to place, it is desired to temporarily detain the animal in a fixed place. The leash of the present invention is adapted to accommodate such a purpose, especially if the anchoring device is of large dimensions, such as the trunk of a tree. Instead of attaching the proximal hook 4 to the fixed position ring 6, as would be the case for creating a normal hand hold, the proximal hook 4 is interconnected to the ring 18 which is positioned distally of the hook 6 so as to create a loop 46 that is large enough to encircle the anchoring object, such as a tree 51. If desired, the larger loop 46 can be trained around the waist of the person leading or otherwise controlling the animal; to provide a hands free leash.

What is claimed is:

1. A leash for leading or restraining an animal, comprising,
   (a) an elongated strap of flexible material having interior and exterior sides and first and second ends,
   (b) a first hook secured to the first end of the strap,
   (c) a first hook-receiving ring secured to the strap intermediate the first and second ends,
   (d) a second hook secured to the second end of the strap,
   (e) a second hook-receiving ring slidably attached to the strap intermediate the second end and the first hook-receiving ring, and
   (f) an adjustable stop carried by the strap intermediate the second end and the second hook-receiving ring.

2. The leash of claim 1 and further including a padded lining secured to the interior side of the strap between the first hook and the first hook-receiving ring.

3. The leash of claim 1 where the first hook is a spring hook having a swivel interconnection with the first end of the strap.

4. The leash of claim 1 where the second hook-receiving ring comprises,
   (a) a tri-glide having one inner and two outer mutually parallel rungs and
   (b) a D ring attached to the inner rung.

5. The leash of claim 4 where the second hook is a spring hook.

6. The leash of claim 1 where the adjustable stop comprises a ladder loc having one inner and two outer mutually parallel rungs and where the strap is snugly trained over the inner rung and under each of the outer rungs.

7. The leash of claim 4 and further including a protective tag attached to one of the two outer parallel rungs and disposed to lie against the interior side of the strap.

8. An animal leash comprising,
   (a) an elongated flexible strap having first and second ends,
   (b) first hook and ring means attached respectively to the first end of the strap and to a distal point on the strap for selectively creating a loop at the first end of the strap;
   (c) second hook means attached to the second end of the strap,
   (d) a slidable mounting means, having an attached ring for receiving the second hook means, said mounting means carried by the strap intermediate the second end and the first ring means, and
   (e) adjustable stop means carried by the strap intermediate the second end of the strap and the slidable mounting means, for limiting contraction of the loop.

9. A leash for leading or restraining an animal, comprising,
   (a) a strap of flexible material having interior and exterior sides and first and second ends,
   (b) a first spring hook secured to the first end of the strap,
   (c) a first hook-receiving ring secured to the strap intermediate the first and second ends,
   (d) a second spring hook secured to the second end of the strap,
   (e) a second hook-receiving ring slidably attached to the strap intermediate the second end of the strap and the first hook-receiving ring, said second hook-receiving ring comprising;
   (f) a tri-glide having one inner and two outer mutually parallel rungs and
   (g) a D ring attached to the inner rung, and
   (h) an adjustable stop carried by the strap intermediate the second end of the strap and the second hook-receiving ring, said stop comprising a ladder loc having one inner and two outer mutually parallel rungs and where the strap is snugly trained over the inner rung and under each of the outer rungs.

* * * * *